US012808692B2

(12) United States Patent
Kabune et al.

(10) Patent No.: US 12,808,692 B2
(45) Date of Patent: Nov. 24, 2026

(54) SENSOR DEVICE

(71) Applicant: DENSO CORPORATION, Kariya-city (JP)

(72) Inventors: Hideki Kabune, Kariya-city (JP); Toshihiro Fujita, Kariya-city (JP); Nao Uematsu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 113 days.

(21) Appl. No.: 19/035,414

(22) Filed: Jan. 23, 2025

(65) Prior Publication Data

US 2025/0164285 A1 May 22, 2025

Related U.S. Application Data

(63) Continuation of application No. PCT/JP2023/026029, filed on Jul. 14, 2023.

(30) Foreign Application Priority Data

Jul. 25, 2022 (JP) ................................ 2022-117824

(51) Int. Cl.
*G01D 5/14* (2006.01)
*G01B 7/30* (2006.01)

(52) U.S. Cl.
CPC .................................... *G01D 5/145* (2013.01)

(58) Field of Classification Search
CPC ............. G01D 5/14; G01D 5/145; G01B 7/30
See application file for complete search history.

(56) References Cited

U.S. PATENT DOCUMENTS 10,960,919 B2 * 3/2021 Yamanaka ............. B62D 5/046
2013/0132018 A1 5/2013 Kubota et al.
2015/0239496 A1 8/2015 Kozawa et al.

FOREIGN PATENT DOCUMENTS

CN 106915299 * 12/2015 ............. G01C 21/26
JP H05-64007 U 8/1993
JP 4935241 B2 5/2012

* cited by examiner

*Primary Examiner* — Neel D Shah
(74) *Attorney, Agent, or Firm* — Precision Patents, P.C.

(57) ABSTRACT

A sensor device remains partially operational using battery power when the starting switch is off. It includes a sensor input processor with a sensor element that detects changes in physical quantities due to the movement of a detection target. An input processing circuit calculates sensor information based on these detected values. The device also has a memory that stores abnormality information, including power failure data when battery power is not supplied during the switch-off period. A voltage holding circuit on the battery feed line powers the sensor input processor without passing through the starting switch, maintaining sufficient voltage to retain data in memory during temporary battery voltage drops. Additionally, the sensor input processor includes an adjustment circuit that sequentially stops functions other than data retention based on the voltage of the voltage holding circuit when it drops.

4 Claims, 16 Drawing Sheets

SENSOR DEVICE

CROSS REFERENCE TO RELATED APPLICATIONS

The present application is a continuation application of International Patent Application No. PCT/JP2023/026029 filed on Jul. 14, 2023, which designated the U.S. and claims the benefit of priority from Japanese Patent Application No. 2022-117824 filed on Jul. 25, 2022. The entire disclosures of all of the above applications are incorporated herein by reference.

TECHNICAL FIELD

The present disclosure relates to a sensor device.

BACKGROUND

Conventional sensor devices detect an angle of rotation of motors.

SUMMARY

According to at least one embodiment, a sensor device is capable of continuing to operate at least partially with electric power supplied from a battery during a period when a starting switch is turned off. The sensor device includes a sensor input processor that has a sensor element. This sensor element detects a change in a physical quantity in response to the movement of a detection target. An input processing circuit calculates sensor information according to the detected value of the sensor element. A memory is also included, which stores abnormality information. This abnormality information includes power failure information pertaining to a power failure in which electric power is not supplied from the battery during the period when the starting switch is turned off. Additionally, a voltage holding circuit is provided on a battery feed line, which supplies battery power to the sensor input processor without going through the starting switch. This circuit is capable of applying a voltage to the sensor input processor sufficient to retain at least data in the memory during a temporary voltage drop in the battery. The sensor input processor has an adjustment circuit configured to sequentially stop functions other than data retention in the memory based on a voltage of the voltage holding circuit when the voltage of the voltage holding circuit drops.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

To begin with, examples of relevant techniques will be described.

Conventional sensor devices detect an angle of rotation of motors and other devices. A sensor device according to a comparative example is applied to an electric power steering system and is capable of continuing to operate at least in part with power from a battery during periods when an ignition power is turned off.

In the sensor device of the comparative example, if a battery voltage drops due to a large electric current to a starter at engine startup, for example, when a battery life is approaching, the sensor device may not be able to continue operation. In contrast to the comparative example, according to a sensor device of the present disclosure, operation can at least partially continue when a battery voltage drops.

According to one aspect of the present disclosure, a sensor device is capable of continuing to operate at least partially with electric power supplied from a battery during a period when a starting switch is turned off. The sensor device includes a sensor input processor that has a sensor element. This sensor element detects a change in a physical quantity in response to the movement of a detection target. An input processing circuit calculates sensor information according to the detected value of the sensor element. A memory is also included, which stores abnormality information. This abnormality information includes power failure information pertaining to a power failure in which electric power is not supplied from the battery during the period when the starting switch is turned off. Additionally, a voltage holding circuit is provided on a battery feed line, which supplies battery power to the sensor input processor without going through the starting switch. This circuit is capable of applying a voltage to the sensor input processor sufficient to retain at least data in the memory during a temporary voltage drop in the battery. The sensor input processor has an adjustment circuit configured to sequentially stop functions other than data retention in the memory based on a voltage of the voltage holding circuit when the voltage of the voltage holding circuit drops.

As a result, the sensor device is capable of continuing to operate at least partially even when the battery voltage drops.

Hereinafter, a sensor device according to the present disclosure will be described with reference to the drawings. Hereinafter, in a plurality of embodiments, substantially the same components are denoted by the same reference signs, and the description thereof is omitted.

First Embodiment

Figure 1:
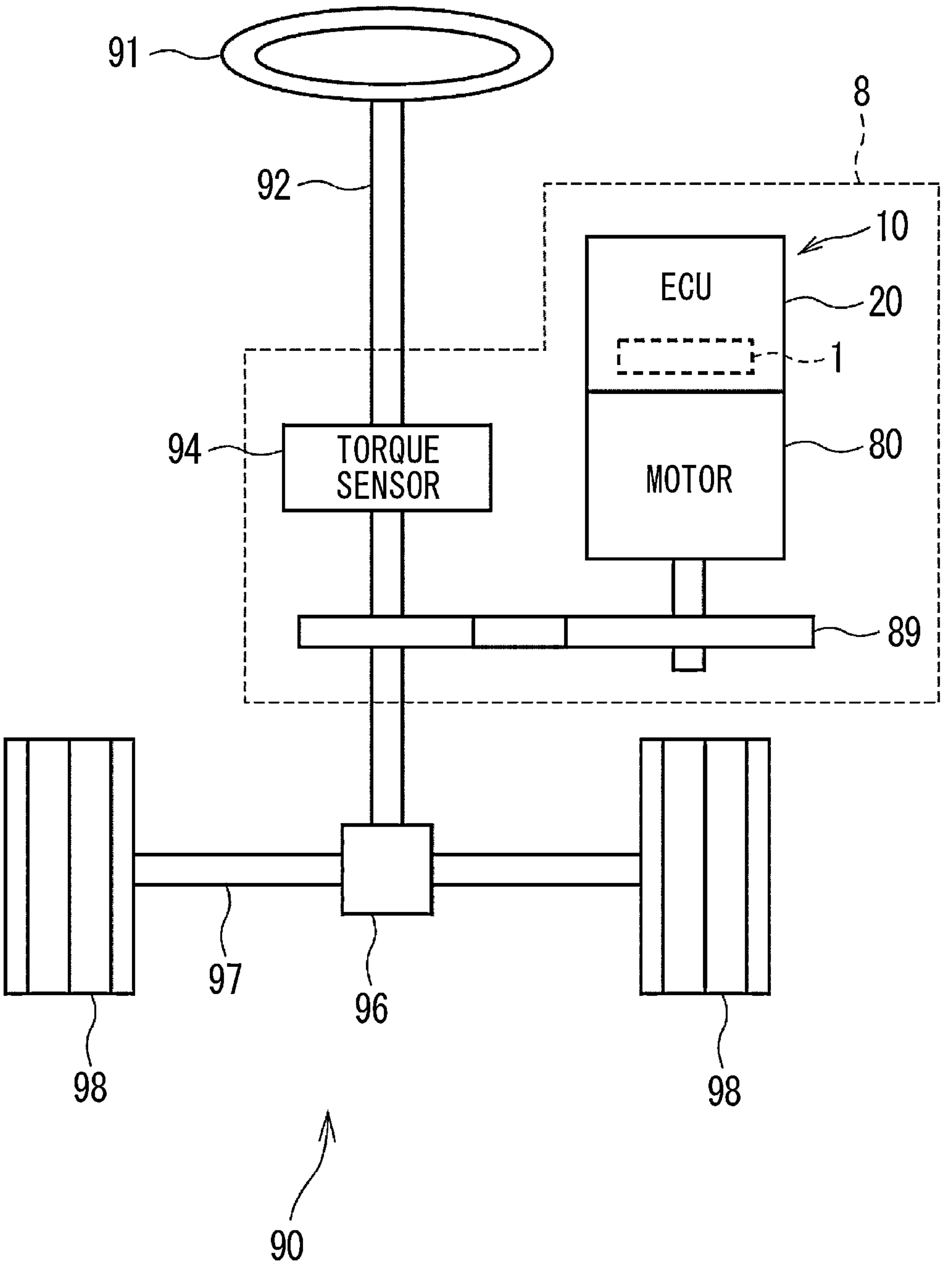
FIG. 1 is a schematic configuration diagram of a steering system according to a first embodiment.

A first embodiment is shown in FIGS. 1 to 5. A sensor device 1 of the present embodiment is applied to an electric power steering apparatus 8. FIG. 1 shows a configuration of a steering system 90 including the electric power steering apparatus 8. The steering system 90 includes a steering wheel 91 as a steering member, a steering shaft 92, a pinion gear 96, a rack shaft 97, wheels 98, the electric power steering apparatus 8, and the like.

The steering wheel 91 is connected to the steering shaft 92. A torque sensor 94 is provided on the steering shaft 92 to detect a steering torque. The pinion gear 96 is provided at an axial end of the steering shaft 92. The pinion gear 96 meshes with the rack shaft 97. A pair of wheels 98 is coupled to both ends of the rack shaft 97 via, for example, tie rods.

When a driver of a vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of wheels 98 is steered to an angle corresponding to a displacement amount of the rack shaft 97.

The electric power steering apparatus 8 includes a drive device 10 having an ECU 20 and a motor 80, a reduction gear 89 which is a power transmission unit that reduces rotation of the motor 80, and transmits the reduced rotation to the steering shaft 92. That is, the electric power steering apparatus 8 of the present embodiment is a column assist type, in which the steering shaft 92 is an object to be driven. The electric power steering apparatus 8 may be a rack assist type, in which the rotation of the motor 80 is transmitted to the rack shaft 97.

The motor 80 outputs part or all of a torque required for steering, and is driven by a power supplied from a battery 99 (see FIG. 2) to rotate the reduction gear 89 forward and backward. The drive device 10 is a so-called "mechanically and electrically integrated type" in which the ECU 20 is provided on one side in an axial direction of the motor 80, but it may be a mechanical and electrically separated type in which the motor and the ECU are separately provided. By adopting the mechanical and electrical integrated type, the ECU 20 and the motor 80 can be efficiently arranged in the vehicle having a limited mounting space. The ECU 20 is provided with the sensor device 1.

Figure 2:
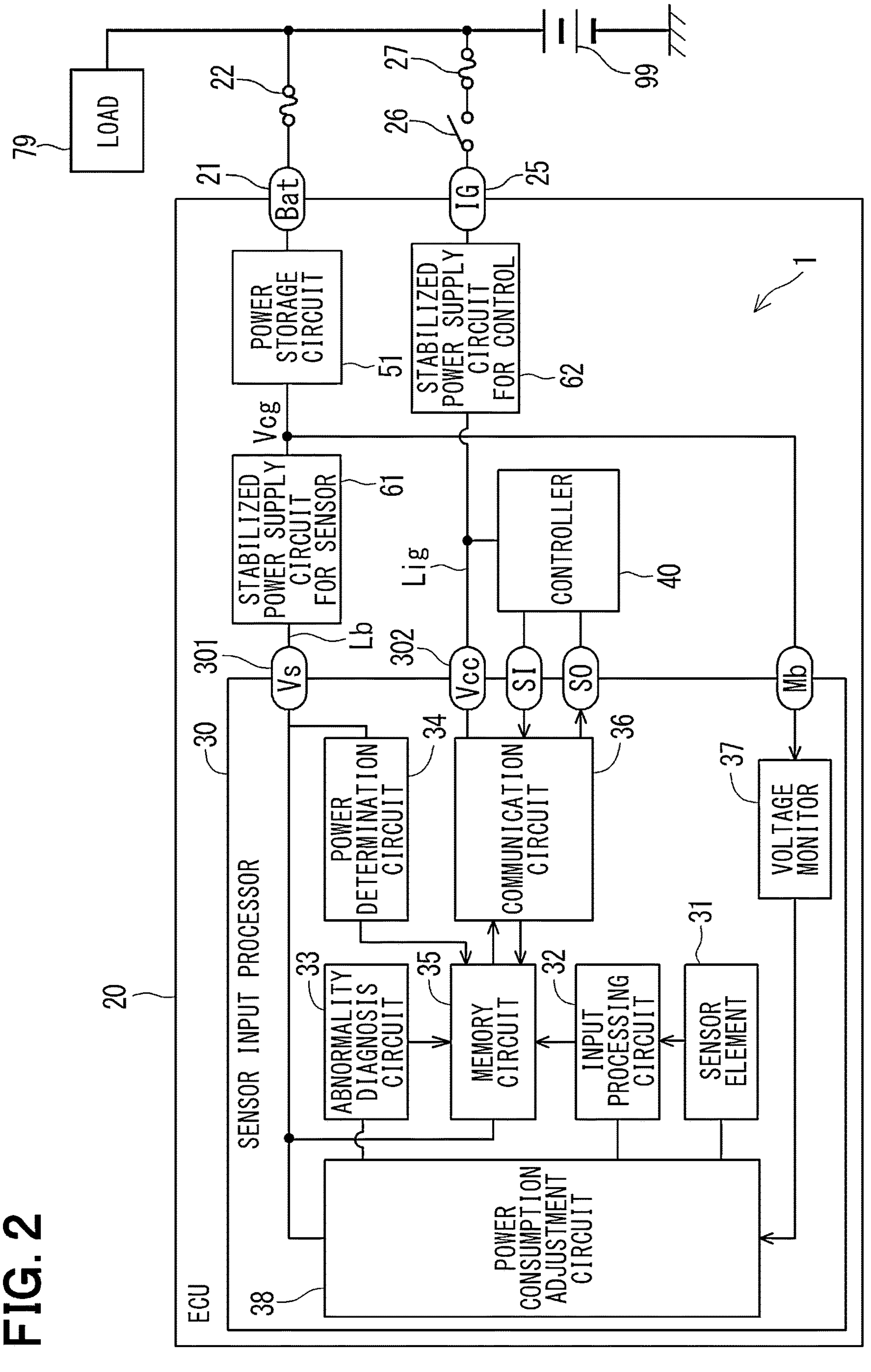
FIG. 2 is a block diagram illustrating a sensor device according to the first embodiment.

As shown in FIG. 2, the ECU 20 is supplied with electric power from the battery 99. The battery 99 is shared with other loads 79. In the present embodiment, the other loads 79 are, for example, a starter motor. The ECU 20 has a battery terminal 21 and an ignition terminal 25. The battery terminal 21 is supplied with electric power directly from the battery 99 without going through a starting switch 26 of a vehicle, which is an ignition switch or the like. The ignition terminal 25 is supplied with electric power from the battery 99 via the starting switch 26. Fuses 22, 27 are provided in power supply wires of the battery terminal 21 and the ignition terminal 25. Hereinafter, the starting switch is referred to as "IG" as appropriate.

The sensor device 1 has a sensor input processor 30, a controller 40, and a power storage circuit 51. The sensor input processor 30 has a sensor element 31, an input processing circuit 32, an abnormality diagnosis circuit 33, a power determination circuit 34, a memory circuit 35, a communication circuit 36, a voltage monitor circuit 37, and a power consumption adjustment circuit 38.

The sensor device 1 has a first power supply terminal 301 (Vs) connected to the battery terminal 21 and a second power supply terminal 302 (Vcc) connected to the ignition terminal 25. The sensor device 1 of the present embodiment is configured to continue at least some operations, including counting the number TC of rotations of the motor 80, with power supplied from the battery 99 via the first power supply terminal 301 even when the IG is off.

A voltage generated from a voltage supplied from the battery terminal 21 and supplied to the first power supply terminal 301 is referred to as a sensor power supply voltage Vs, and a voltage generated from a voltage supplied from the ignition terminal 25 and supplied to the second power supply terminal 302 as a Vcc voltage. A wire connecting the battery terminal 21 to the first power supply terminal 301 is a battery feed line Lb, and a wire connecting the ignition terminal 25 to the second power supply terminal 302 is an ignition feed line Lig. A stabilized power supply circuit 61 for sensors, such as a regulator, is provided on the battery feed line Lb, and a stabilized power supply circuit 62 for control is provided on the ignition feed line Lig.

The sensor element 31 is, for example, a magnetic resistance element such as an AMR sensor, a TMR sensor, a GMR sensor, or a Hall element, and detect a magnetic field of a sensor magnet (not shown) that rotates integrally with a shaft of the motor 80, and outputs the detection signal to the input processing circuit 32. In the present embodiment, a plurality of sensor elements 31 are provided.

The input processing circuit 32 calculates a motor rotation angle θm and the number TC of rotations (rotation count TC) of the motor 80 based on the detected values of the sensor element 31. An element used to calculate the motor rotation angle θm and an element used to calculate the rotation count TC may be separated, or the detected values of at least some elements may be shared for the calculation of the motor rotation angle θm and the rotation count TC. The calculation results are stored in the memory circuit 35. The number of rotations TC can be calculated based on a count value, for example, by dividing one rotation of the motor 80 into three or more regions and counting up or down according to a rotation direction each time the region changes. The rotation count TC is used to calculate an absolute angle θa, which is an amount of rotation from a reference position including multiple rotation information. The absolute angle θa is a value that can be converted into a steering angle θs using a gear ratio or the like.

The abnormality diagnosis circuit 33 diagnoses abnormalities in the input processing circuit 32. The abnormality diagnosis results are stored in the memory circuit 35. The power determination circuit 34 determines a power failure in which the electric power supplied directly from the battery 99 via the first power supply terminal 301 is disrupted.

The memory circuit 35 stores information to be sent to the controller 40, such as the motor rotation angle θm, the rotation count TC, the abnormality diagnosis results, and information pertaining to the power failure. A memory area that stores each piece of information can be made redundant as two or more bits to enable anomaly detection by comparison or majority vote. It may also comprise a cyclic redundancy code (CRC), an error correction code (ECC) or an error detection code (EDC). As a result, reliability can be improved and products that require high functional safety can be used.

The communication circuit 36 transmits the motor rotation angle θm, the rotation count TC, the abnormality diagnosis results, and information pertaining to the power failure to the controller 40. The communication circuit 36 also receives various information from the controller 40. When the IG is turned on, the communication circuit 36 transmits to the controller 40 the number of rotations TC during IG off, the results of the abnormality diagnosis, and power failure information in response to a request signal from the controller 40. When the return signal is received from the controller 40, the results of the abnormality diagnosis and information pertaining to the power failure in the memory circuit 35 are cleared. When there are multiple memory areas for storing the abnormality diagnosis results and the power failure information, the determination results of the abnormality diagnosis circuit 33 and the power determination circuit 34 may be stored in multiple areas of memory simultaneously and cleared at different times. For example, if there are two memory areas, after transmitting the power failure information in response to the request signal sent by the controller 40 when the IG is turned on, one memory area is cleared in response to the return signal sent when the controller 40 receives the power failure information, and the other memory area is cleared in response to the return signal sent at any time after cranking is completed, such as the sequence when the IG is turned off.

The voltage monitor circuit 37 monitors the voltage on the battery feed line Lb. In the present embodiment, a charge voltage Vcg between the power storage circuit 51 and the stabilized power supply circuit 61 for the sensors is monitored, but the sensor power supply voltage Vs or a battery terminal voltage may be monitored instead of the charge voltage Vcg. The power consumption adjustment circuit 38 adjusts power consumption within the sensor input processor 30 according to the charge voltage Vcg. Details will be described later.

The controller 40 is mainly composed of a microcomputer and the like, and internally includes, although not shown in the figure, a central processing device (i.e., CPU), a read only memory (i.e., ROM), a random access memory (i.e., RAM), an input-output (i.e., I/O), a bus line for connecting these components, and the like. Each process executed by the controller 40 may be a software process or may be a hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit.

The controller 40 performs various calculations related to drive control of the motor 80. The controller 40 also calculates the absolute angle θa using the motor rotation angle θm and the rotation count TC. In the present embodiment, at least one sensor element 31, the input processing circuit 32, and the memory circuit 35 are constantly powered so that the calculation of the rotation count TC continues during a period when the IG is turned off. Thereby, even if the motor 80 is rotated by steering the steering wheel 91 while the IG is turned off, the steering angle θs can be calculated without relearning the reference position. Since the value when the IG is on may be used as the motor rotation angle θm, there is no need to continue calculation by constant power supply.

When the battery 99 is nearing the end of its service life, the sensor input processor 30 may become inoperable if a battery voltage Vbat drops due to a large electric current flowing to a starter during engine startup. If detection of the rotation count TC is interrupted due to the voltage drop, the steering angle θs must be relearned, delaying the start of controls such as an electronic stability control (ESC) and automated driving that use the steering angle θs.

Therefore, in the present embodiment, the power storage circuit 51 is provided so that the sensor input processor 30 can be supplied with a guaranteed operating voltage during a voltage holding period even if the voltage drop occurs in the battery 99 due to driving a load 79 that has a large effect on the battery voltage Vbat, such as a starter motor. The voltage holding period is set according to a time span required for the voltage drop due to the starter drive to recover, for example.

Figure 3:
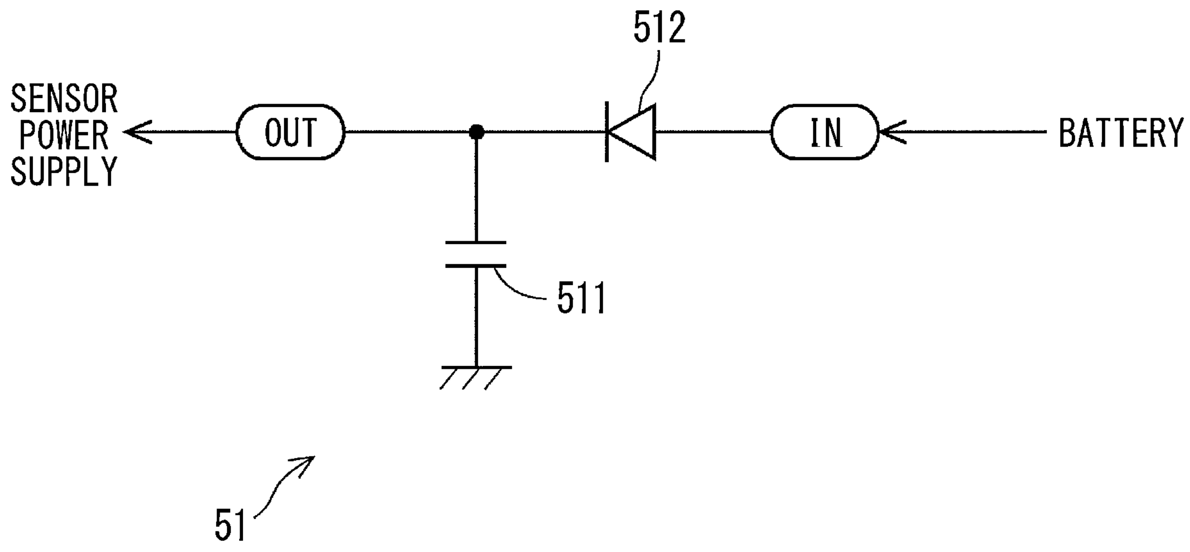
FIG. 3 is a circuit diagram illustrating a power storage circuit according to the first embodiment.

As shown in FIG. 3, the power storage circuit 51 has a capacitor 511 and a diode 512. The capacitor 511 is connected to the battery feed line Lb and a ground. The diode 512 is installed on the battery feed line Lb so that an anode is connected to the battery terminal 21 and a cathode is connected to the capacitor 511.

Figure 4:
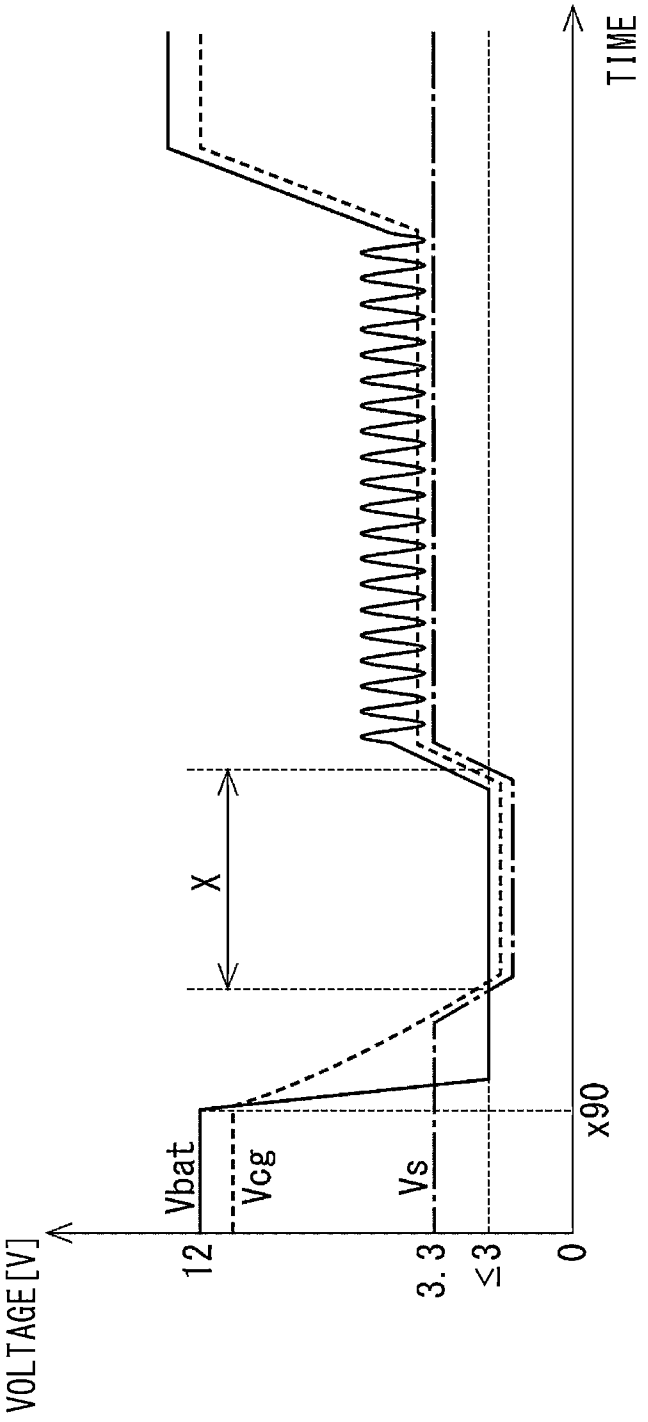
FIG. 4 is a time chart illustrating voltage during cranking under battery degradation conditions according to a reference example.
Figure 5:
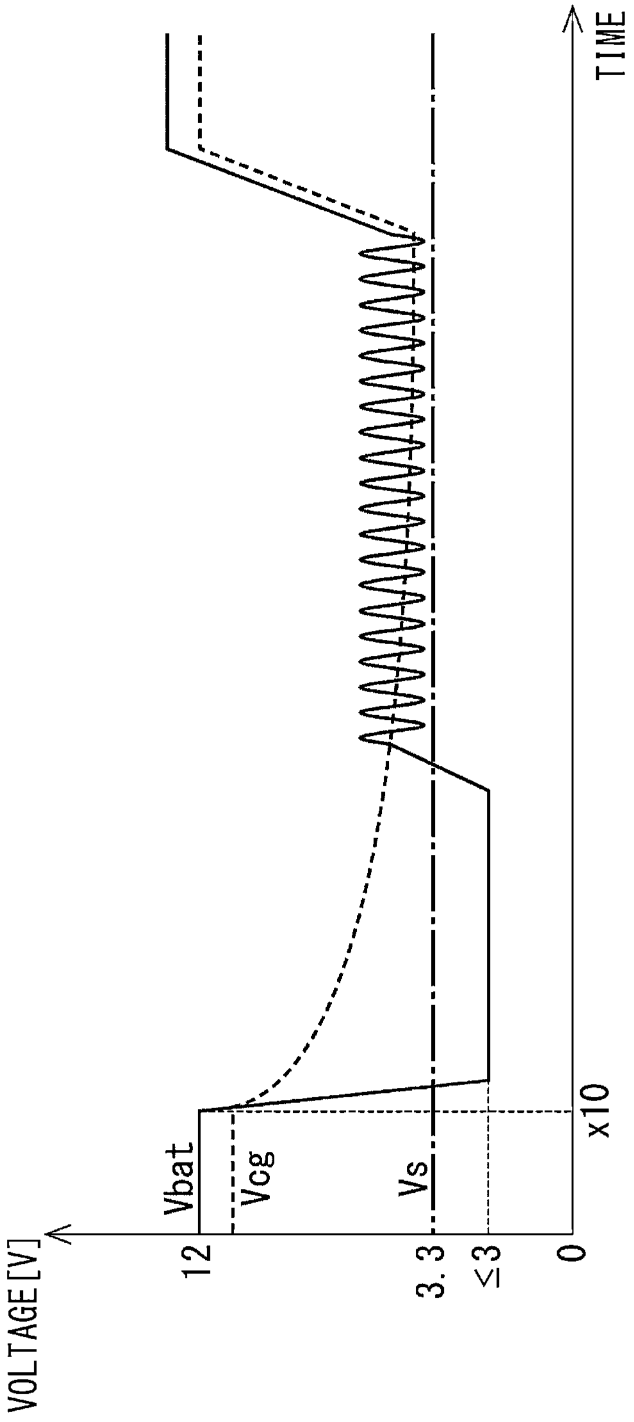
FIG. 5 is a time chart illustrating voltage during cranking under battery degradation conditions according to the first embodiment.

FIGS. 4, 5 are time charts showing the voltage during cranking under battery degradation conditions, with the battery voltage Vbat shown as a solid line, the charge voltage Vcg as a dashed line, and the sensor power supply voltage Vs as a dash-dot-dash line. The same applies to FIG. 10 and the like. In a reference example of FIG. 4, when the charge voltage Vcg is sufficiently high, the sensor power supply voltage Vs is adjusted to a set value (for example, 3.3 [V]) by the stabilized power supply circuit 61 for the sensors. The sensor power supply voltage Vs becomes a value corresponding to the charge voltage Vcg when the charge voltage Vcg falls below the set value.

As in the reference example shown in FIG. 4, when the power storage circuit 51 is not provided, at time point x90, when the battery voltage Vbat drops due to the cranking, the sensor power supply voltage Vs drops below a minimum operating voltage (for example, 3.0 [V]) and a stop period X occurs during which the sensor input processor 30 stops operating. Similarly, when a capacity of the power storage circuit 51 is insufficient, the sensor input processor 30 may not be able to operate.

As shown in FIG. 5, when the power storage circuit 51 is provided, when the battery voltage Vbat drops due to the cranking at time point x10, the electric power stored in the capacitor 511 is supplied to the sensor input processor 30. Therefore, the charge voltage Vcg drops slowly and the sensor power supply voltage Vs can be maintained at the set value during the cranking period. A rate of decrease of the charge voltage Vcg depends on the capacitance of the capacitor 511. Therefore, the capacity of the capacitor 511 is set so that it can hold enough voltage to allow operation of the sensor input processor 30 during a period when the battery voltage Vbat is low due to the cranking. As a result, the sensor input processor 30 is able to continue operating even when the battery voltage drops due to the cranking. The battery voltage after the cranking is completed is higher than when IG is turned on due to the power generation voltage of an alternator (not shown).

In the present embodiment, the sensor input processor 30 has the power consumption adjustment circuit 38. The power consumption adjustment circuit 38 reduces the power consumption by stopping the power supply for each circuit block based on the charge voltage Vcg detected by the voltage monitor circuit 37. As a result, the capacitance required for the capacitor 511 is reduced.

Figure 6:
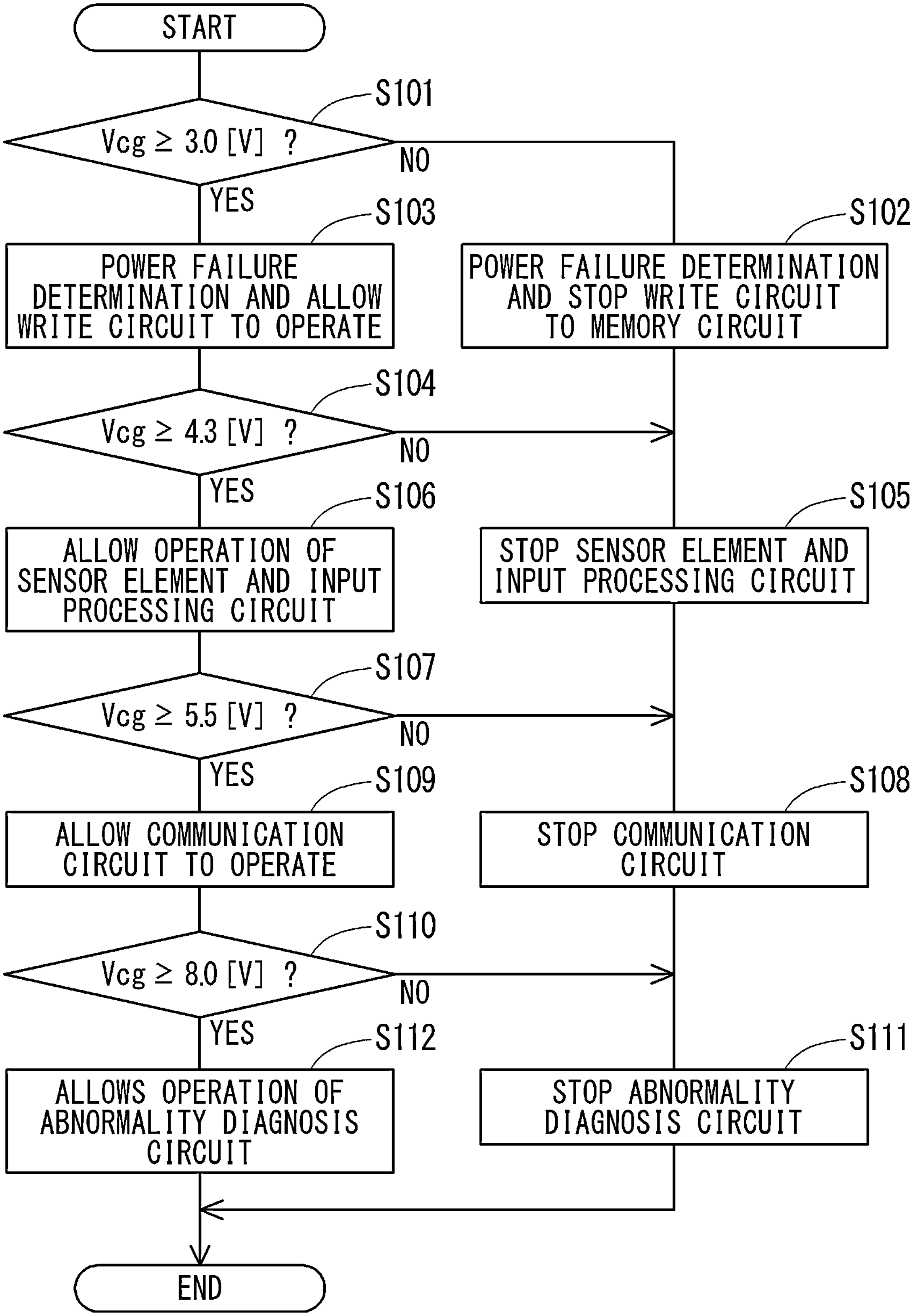
FIG. 6 is a flowchart illustrating a suppressing process of power consumption according to the first embodiment.

A suppressing process of the power consumption of the present embodiment will be described with reference to a flowchart of FIG. 6. This process is executed by the power consumption adjustment circuit 38 at a predetermined cycle. Hereinafter, "step" may be simply referred to as a symbol "S".

In S101, the power consumption adjustment circuit 38 determines whether the charge voltage Vcg is 3.0 [V] or higher. When it is determined that the charge voltage Vcg is less than 3.0 [V] (S101: NO), the process proceeds to S102 to stop the power failure determination and a write circuit to the memory circuit 35. Since a minimum guaranteed operating voltage of the memory circuit 35 is less than 3.0 [V] (for example, 2.0 [V]), new writing to the memory circuit 35 is stopped, but the information already written is retained. When it is determined that the charge voltage Vcg is 3.0 [V] or more (S101: YES), the process proceeds to S103. In S103, it determines the power failure and allows the write circuit to operate on the memory circuit 35.

In S104, the power consumption adjustment circuit 38 determines whether the charge voltage Vcg is 4.3 [V] or higher. When it is determined that the charge voltage Vcg is less than 4.3 [V] (S104: NO), the process proceeds to S105 to stop the sensor element 31 and the input processing circuit 32. When it is determined that the charge voltage Vcg is 4.3 [V] or higher (S104: YES), the process proceeds to S106. In S106, the power consumption adjustment circuit 38 allow operation of the sensor element 31 and the input processing circuit 32.

In S107, the power consumption adjustment circuit 38 determines whether the charge voltage Vcg is 5.5 [V] or higher. When it is determined that the charge voltage Vcg is less than 5.5 [V] (S107: NO), the process proceeds to S108 and stops the communication circuit 36. When it is determined that the charge voltage is 5.5 [V] or higher (S107: YES), the process proceeds to S109 to allow the communication circuit 36 to operate.

In S110, the power consumption adjustment circuit 38 determines whether the charge voltage Vcg is 8.0 [V] or higher. When it is determined that the charge voltage Vcg is less than 8.0 [V] (S110: NO), the process proceeds to S111 to stop the abnormality diagnosis circuit 33. When it is determined that the charge voltage Veg is 8.0 [V] or higher (S110: YES), the process proceeds to S112 and allows the operation of the abnormality diagnosis circuit 33.

In the present embodiment, the minimum operating voltage to be operated for each function is determined from the functional aspect, and the operation is stopped according to the charge voltage Vcg. The determination thresholds of S101, S104, S107, and S110 in FIG. 6 correspond to the minimum operating voltage for each function. The determination thresholds shown here are an example and can be set arbitrarily. In addition, the order in which functions are stopped may differ because a priority level varies depending on the application used. The same applies to each of the determination thresholds in the suppressing process of the power consumption for the embodiments described below.

As described above, the sensor device 1 of the present embodiment is able to continue to operate at least partially with the electric power supplied from the battery 99 during the period when the starting switch 26 is turned off. The sensor device 1 includes the sensor input processor 30 and the power storage circuit 51.

The sensor input processor 30 has the sensor element 31, the input processing circuit 32, and the memory circuit 35. The sensor element 31 detects the change in physical quantity in response to the operation of the motor 80. The input processing circuit 32 calculates the motor rotation angle θm and the rotation count TC as sensor information according to the detection value of the sensor element 31. The memory circuit 35 stores abnormality information, including the power failure information pertaining to the power failure in which the electric power is not supplied from the battery 99 while the starting switch 26 is off, and the results of the sensor input calculation processing.

The power storage circuit 51 is provided on the battery feed line Lb that supplies the electric power from the battery 99 to the sensor input processor 30 without going through the starting switch 26, and can apply the voltage to the sensor input processor 30 that can hold at least the data of the memory circuit 35 during a temporary voltage drop of the battery 99. In detail, by providing the power storage circuit 51, even when the voltage of the battery 99 drops, the voltage that can hold the data in the memory circuit 35 is maintained for the voltage holding period which is set according to the cranking period. As a result, the sensor processing circuit results, the abnormality diagnosis results, and the power failure information during IG off can be retained even when the battery voltage Vbat is temporarily low due to the cranking.

The power storage circuit 51 has the capacitor 511 that is connected to the battery feed line Lb. The electric power stored in the capacitor 511 can be used to properly maintain the sensor power supply voltage Vs when the battery voltage Vbat drops.

The sensor input processor 30 has the power consumption adjustment circuit 38 that sequentially stops functions other than data retention in the memory circuit 35 according to the charge voltage Vcg when the charge voltage Vcg, the voltage of the power storage circuit 51, drops. As a result, a time during which the sensor power supply voltage Vs can be held at or above the guaranteed operating voltage is lengthened. The capacity of the power storage circuit 51 (specifically capacitor 511) can also be lowered.

Second Embodiment

Figure 7:
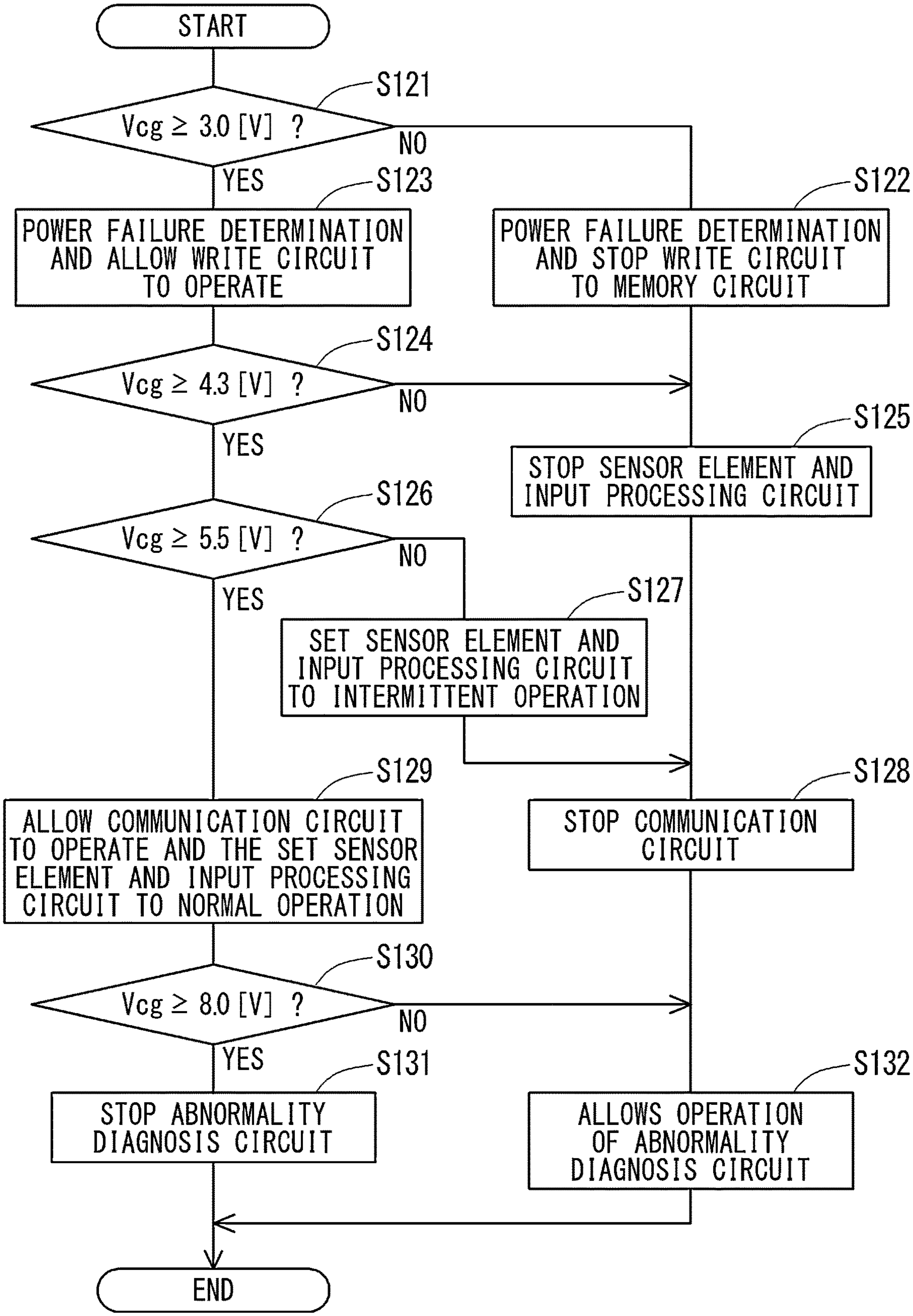
FIG. 7 is a flowchart illustrating a suppressing process of power consumption according to a second embodiment.

A second embodiment will be described with reference to FIG. 7. The second embodiment and a third embodiment are different from the embodiment described above in the suppressing process of the power consumption, and therefore, a description will be focused on the suppressing process.

A suppressing process of the power consumption of the present embodiment will be described with reference to a flowchart of FIG. 7. The processing of S121 to S125 is the same as the processing of S101 to S105 in FIG. 6. In S124, when it is determined that the charge voltage Vcg is 4.3 [V] or more (S124: YES), the process proceeds to S126.

In S126, the power consumption adjustment circuit 38 determines whether the charge voltage Vcg is 5.5 [V] or higher. When it is determined that the charge voltage Vcg is less than 5.5 [V] (S126: NO), the process proceeds to S127, and when it is determined that the charge voltage Vcg is 5.5 [V] or more (S126: YES), the process proceeds to S129.

In S127, which is shifted to when the charge voltage Vcg is greater than 4.3 [V] and less than 5.5 [V], the power consumption adjustment circuit 38 sets the sensor element 31 and the input processing circuit 32 to intermittent operation. The intermittent operation means, for example, that a circuit that normally operates at 100 μs is designed to operate at 1 ms. In S128, which is shifted to when the charge voltage Vcg is less than 5.5 [V], the power consumption adjustment circuit 38 stops the communication circuit 36.

In S129, which is shifted to when the charge voltage Vcg is determined to be 5.5 [V] or higher (S126: YES), the communication circuit 36 is allowed to operate, and the sensor element 31 and the input processing circuit 32 are set to normal operation (operation at 100 μs in the example above). The processing of S130 to S132 is the same as the processing of S110 to S112 in FIG. 6.

In the present embodiment, the sensor element 31 and the input processing circuit 32 are operated intermittently in a predetermined voltage range (for example, between 4.3 [V] and 5.5 [V]) above the minimum operating voltage for detection operation, which stops the operation of the sensor element 31 and the input processing circuit 32 with relatively high power consumption. By reducing the frequency of operation of the sensor element 31 and the input processing circuit 32, the power consumption can be further reduced when the battery voltage is low. In addition, the same effects as those of the above embodiments are exerted.

Third Embodiment

A third embodiment will be described with reference to FIG. 8. In the present embodiment, a sensor power supply voltage Vs is monitored instead of the charge voltage Vcg, and a suppressing process of power consumption is performed. In the present embodiment, the sensor power supply voltage Vs is adjusted to 3.3 [V] or lower, so the minimum operating voltage is set within this range.

Figure 8:
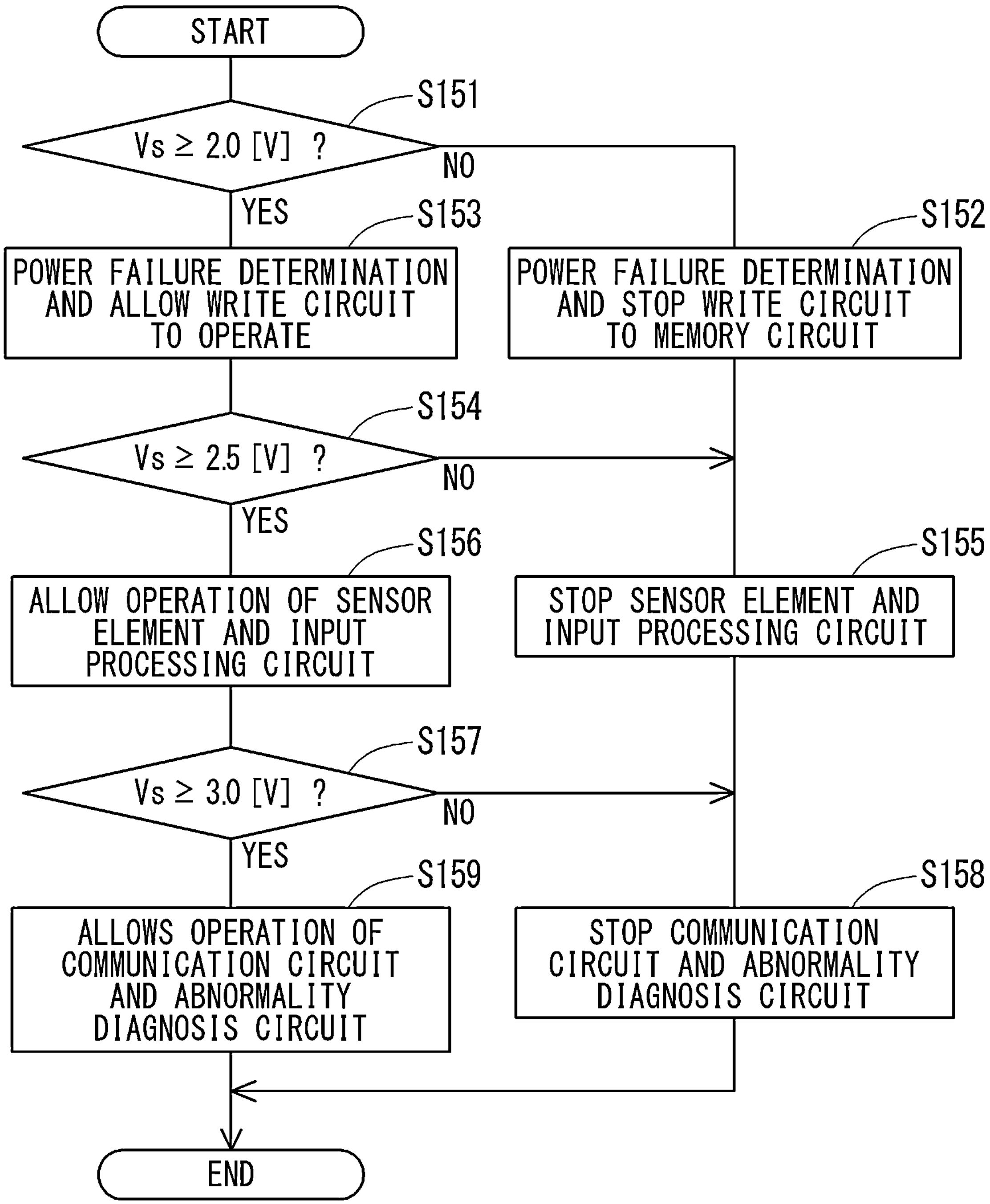
FIG. 8 is a flowchart illustrating a suppressing process of power consumption according to a third embodiment.

The suppressing process of the power consumption based on the sensor power supply voltage Vs is explained based on the flowchart in FIG. 8. In S151, the power consumption adjustment circuit 38 determines whether the sensor power supply voltage Vs is 2.0 [V] or higher. When the sensor power supply voltage Vs is determined to be less than 2.0 [V] (S151: NO), the process proceeds to S152, and when the sensor power supply voltage Vs is determined to be 2.0 [V] or more (S151: YES), the process proceeds to S153. Processes of S152, S153 are similar to the processes of S102, S103 in FIG. 6.

In S154, the power consumption adjustment circuit 38 determines whether the sensor power supply voltage Vs is 2.5 [V] or higher. When it is determined that the sensor power supply voltage is less than 2.5 [V] (S154: NO), the process proceeds to S155, and when it is determined that the sensor power supply voltage Vs is 2.5 [V] or more (S154: YES), the process proceeds to S156. Processes of S155, S156 are similar to the processes of S105, S106 in FIG. 6.

In S157, the power consumption adjustment circuit 38 determines whether the sensor power supply voltage Vs is 3.0 [V] or higher. When it is determined that the sensor power supply voltage Vs is less than 3.0 [V] (S157: NO), the process proceeds to S158 to stop the communication circuit 36 and the abnormality diagnosis circuit 33. When it is determined that the sensor power supply voltage Vs is 3.0 [V] or higher (S157: YES), the process proceeds to S159 to allow the communication circuit 36 and the abnormality diagnosis circuit 33 to operate.

In the present embodiment, the sensor power supply voltage Vs is monitored instead of the charge voltage Vcg, and the power consumption adjustment circuit 38 sequentially stops functions other than data retention in the memory circuit 35 according to the sensor power supply voltage Vs. The same effects as those of the above embodiments can be obtained even in the configuration described above.

Fourth Embodiment

Figure 9:
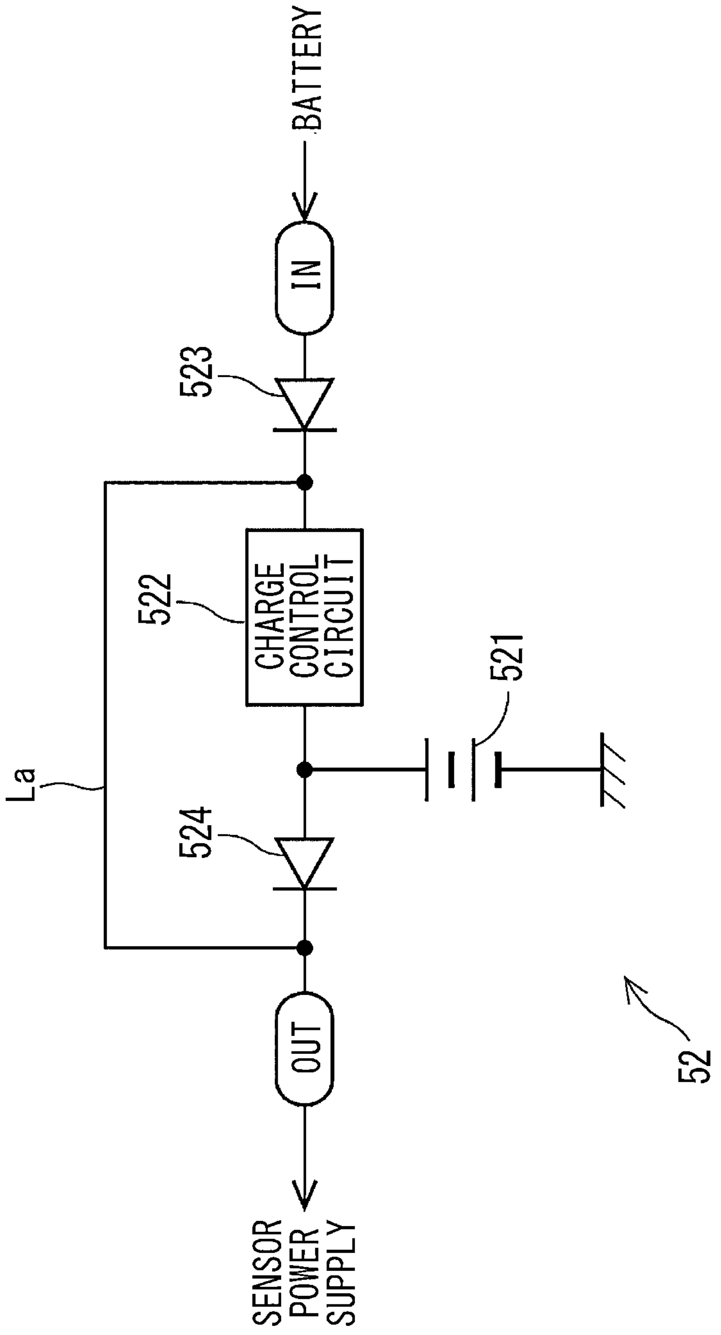
FIG. 9 is a circuit diagram illustrating a power storage circuit according to a fourth embodiment.
Figure 10:
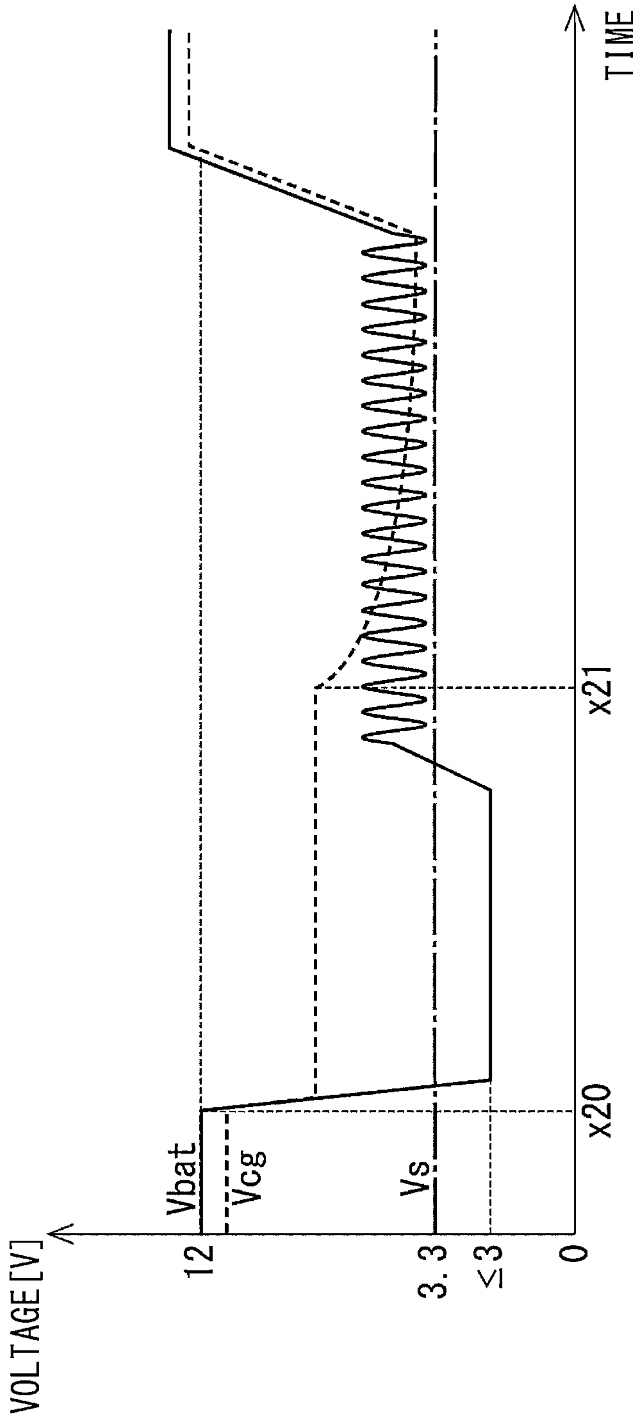
FIG. 10 is a time chart illustrating voltage during cranking under battery degradation conditions according to the fourth embodiment.

A fourth embodiment is illustrated in FIGS. 9, 10. In the present embodiment, a power storage circuit differs from the above embodiment, so this point is the main focus of the explanation. As shown in FIG. 9, the power storage circuit 52 of the present embodiment has a secondary battery 521, a charge control circuit 522, and diodes 523 and 524. The charge control circuit 522 is designed to prevent overcharging of the secondary battery 521 and may be a resistor, for example.

The diodes 523, 524 are both installed so that the anode is connected to the battery and the cathode is connected to the sensor power supply. A diode 523 of the diodes 523, 524 is provided between the battery terminal 21 and the secondary battery 521, and the diode 524 of the diodes 523, 524 is provided between the secondary battery 521 and the stabilized power supply circuit 61 for the sensors.

When the battery voltage Vbat is sufficiently high, the electric power is supplied to the sensor input processor 30 via a wire La connecting the cathode of diodes 523, 524. On the other hand, when the battery voltage Vbat drops, the electric power from the secondary battery 521 is supplied to the sensor input processor 30 via the diode 524.

As shown in FIG. 10, when the battery voltage Vbat drops due to the cranking at time point x20, the electric power stored in the secondary battery 521 is supplied to the sensor input processor 30. Similar to the capacitor 511, capacity of the secondary battery 521 is also set so that it can hold enough voltage to allow operation of the sensor input processor 30 during periods when the battery voltage Vbat is low due to the cranking. In an example in FIG. 10, the charge voltage Vcg is maintained at the voltage of the secondary battery 521 until time point x21, after which it slowly decreases. The sensor power supply voltage Vs is maintained at the set value during the cranking period by the electric power from the secondary battery 521.

In the present embodiment, the power storage circuit 52 has the secondary battery 521 that is connected to the battery feed line Lb. As a result, the sensor power supply voltage Vs can be properly maintained by using the electric power from the secondary battery 521 when the battery voltage Vbat drops. In addition, the same effects as those of the above embodiments are exerted.

Fifth Embodiment

Figure 11:
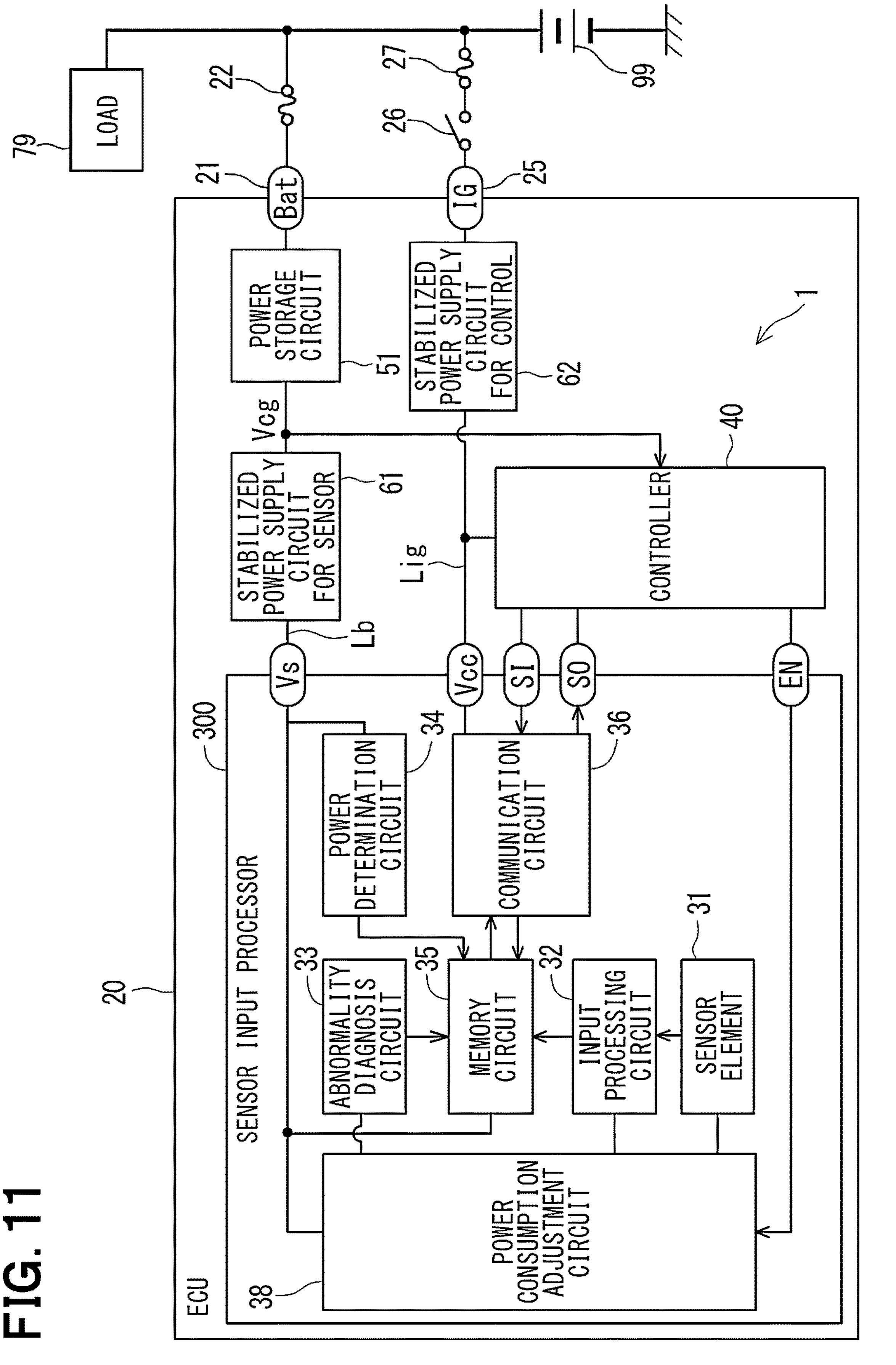
FIG. 11 is a block diagram illustrating a sensor device according to a fifth embodiment.

A fifth embodiment is shown in FIG. 11. A sensor input processor 300 of the present embodiment differs from the above embodiments in that the voltage monitor circuit 37 is omitted. In FIG. 6, the power storage circuit 51 of the first embodiment is assumed to be provided, but it can also be the power storage circuit 52 of the fourth embodiment. In the present embodiment, the charge voltage Vcg is monitored by the controller 40. The calculations related to the suppressing process of the power consumption shown in FIG. 6 are performed by the controller 40, and the power consumption adjustment circuit 38 is operated by commands from the controller 40. As a result, the configuration of the sensor input processor 300 is simplified. In addition, the same effects as those of the above embodiments are exerted.

Sixth Embodiment

Figure 12:
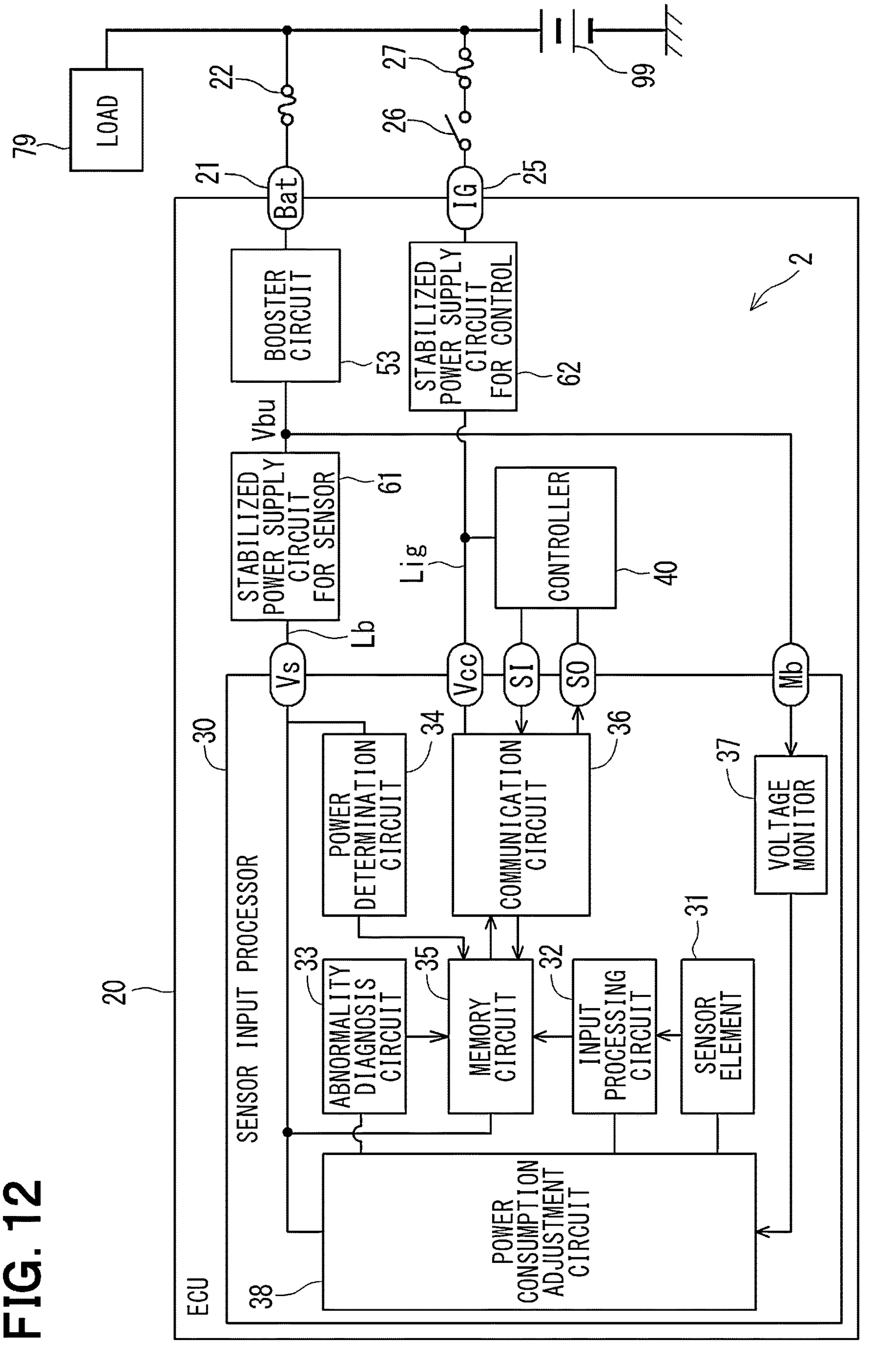
FIG. 12 is a block diagram illustrating a sensor device according to a sixth embodiment.
Figure 13:
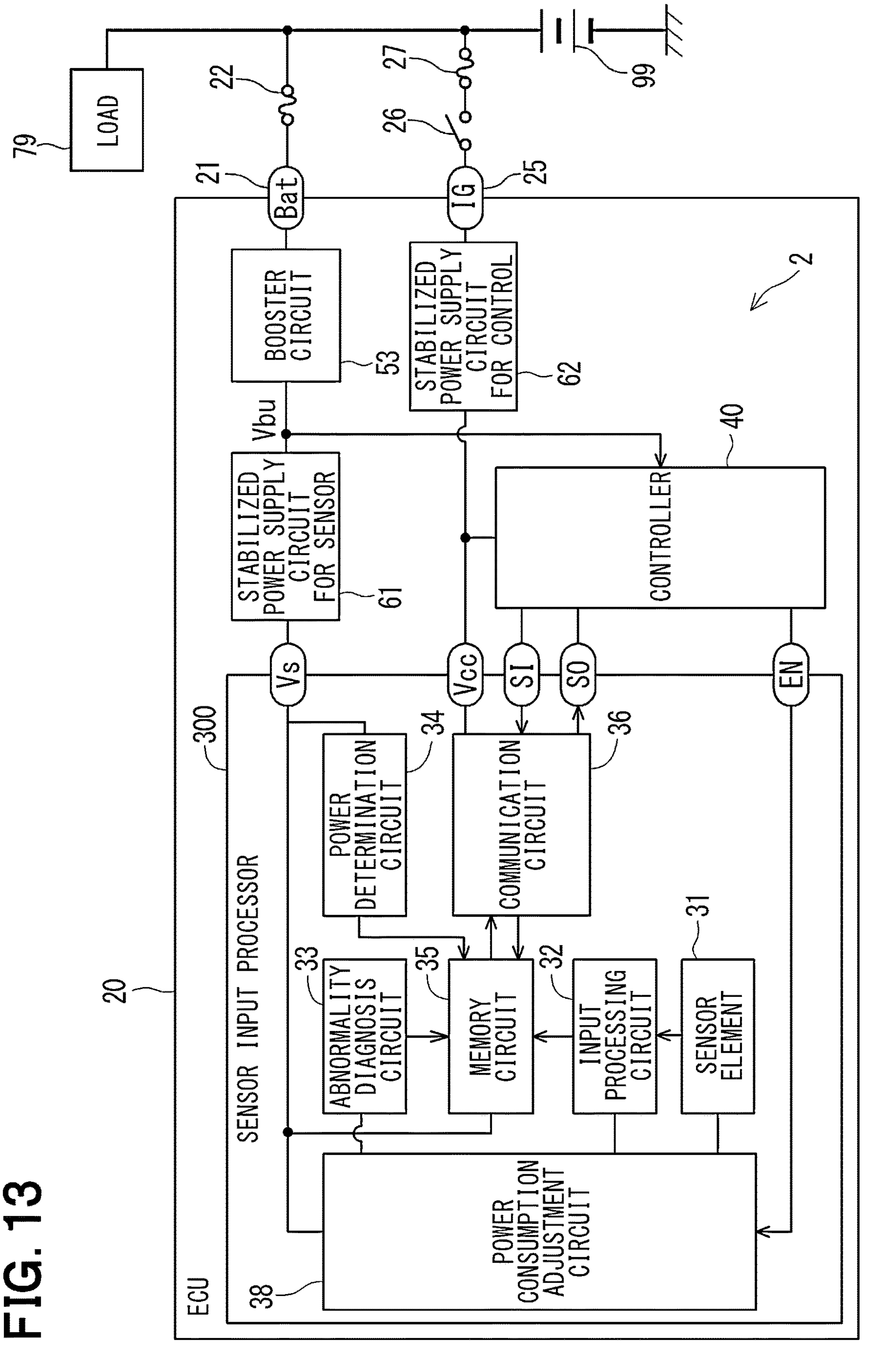
FIG. 13 is a block diagram illustrating a sensor device according to the sixth embodiment.

A sixth embodiment is shown in FIGS. 12 to 16. As shown in FIGS. 12,13, a sensor device 2 differs from the above embodiment in that a booster circuit 53 is provided instead of the power storage circuit. As shown in FIG. 12, a voltage monitor circuit 37 that monitors a boost voltage Vbu may be provided on the sensor input processor 30, or the boost voltage Vbu may be monitored at the controller 40 as shown in FIG. 13.

Figure 14:
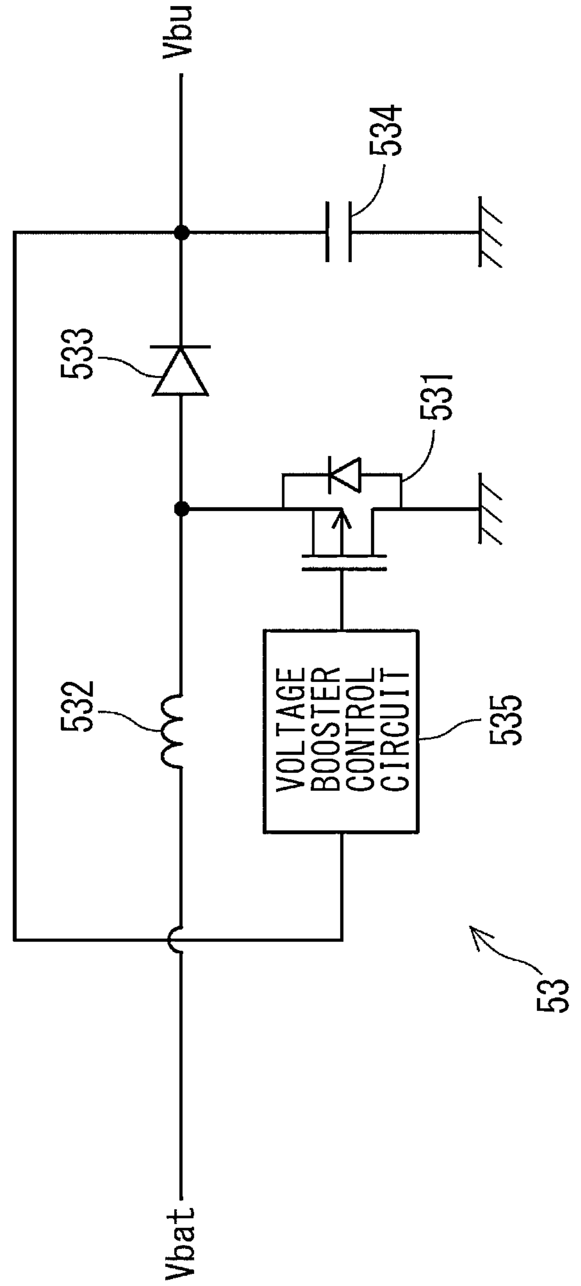
FIG. 14 is a circuit diagram illustrating a booster circuit according to the sixth embodiment.

As shown in FIG. 14, the booster circuit 53 can be a flyback configuration circuit. The booster circuit 53 has a switching element 531, an inductor 532, a diode 533, a capacitor 534, and a booster control circuit 535, and can apply the voltage booster voltage Vbu to the sensor input processor 30 by controlling on-off operation of the switching element 531.

Figure 15:
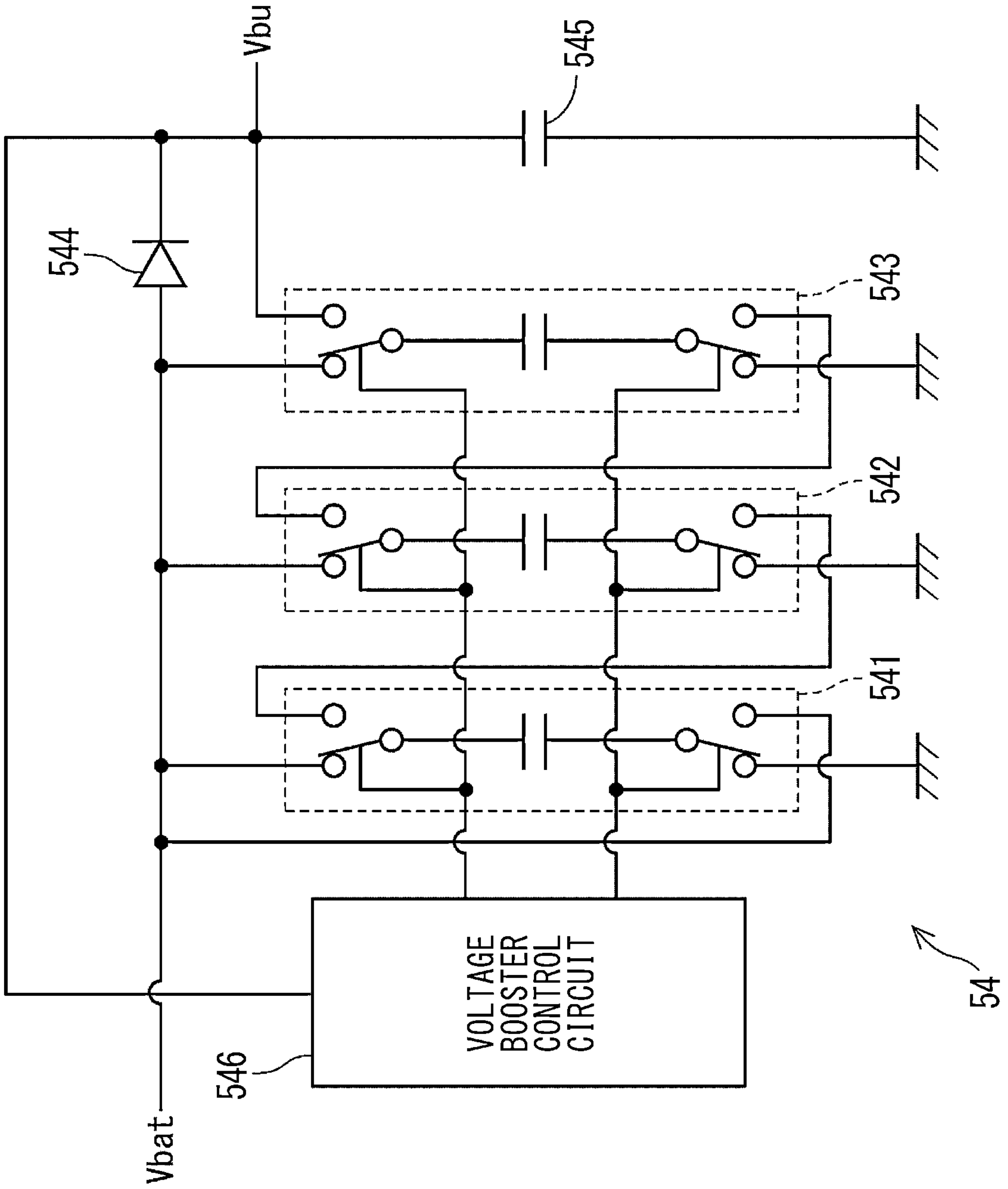
FIG. 15 is a circuit diagram illustrating a booster circuit according to the sixth embodiment.

The booster circuit 53 may be replaced by a booster circuit 54 with a charge pump configuration shown in FIG. 15. The booster circuit 54 has switch circuit sections 541 to 543 consisting of two switches and a capacitor, a diode 544, a capacitor 545, and a booster control circuit 546, and by switching on and off the switch circuit sections 541 to 543, the booster voltage Vbu can be applied to the sensor input processor 30. FIG. 15 shows an example where three switch circuit sections 541 to 543 are provided, but the number of switch circuits can be any number.

The battery voltage Vbat does not actually drop to 0 [V], but remains around 2 [V] when the voltage of the battery 99 drops due to driving a load 79 such as a motor that consumes a large amount of power, such as a starter. Therefore, in the present embodiment, the remaining power of the battery 99 is utilized by providing the booster circuits 53, 54. A type of booster circuit can be other than those shown in the booster circuits 53,54.

Figure 16:
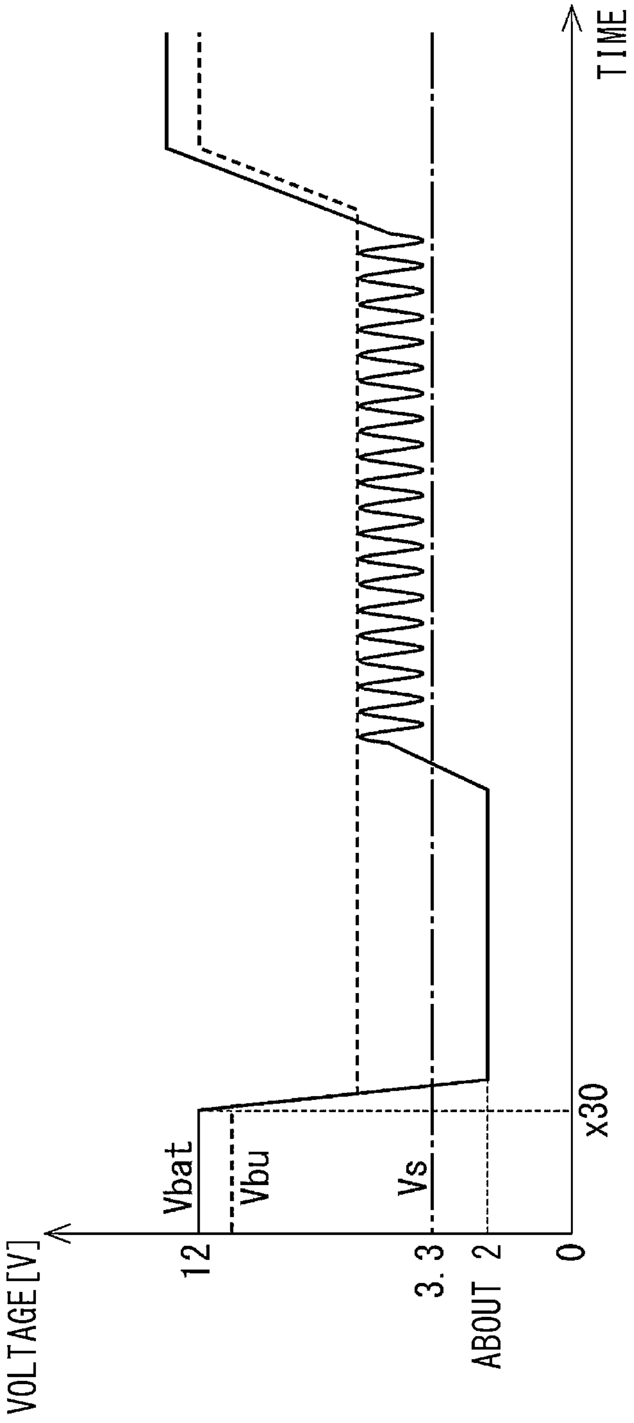
FIG. 16 is a time chart illustrating voltage during cranking under battery degradation conditions according to sixth embodiment.

As shown in FIG. 16, even when the battery voltage Vbat drops due to the cranking at time point x30 and the battery voltage Vbat drops to about 2 [V], the sensor power supply voltage Vs can be maintained at the set value by driving the booster circuits 53, 54. As a result, the operation of the sensor input processor 30 is capable of continuing.

In the present embodiment, the booster circuits 53, 54 are provided on the battery feed line Lb as voltage holding circuits. As a result, the sensor power supply voltage Vs can be properly maintained even when the battery voltage Vbat drops. In addition, the same effects as those of the above embodiments are exerted.

In the embodiment, the memory circuit 35 corresponds to a "storage unit", the power storage circuits 51, 52 and the booster circuits 53, 54 correspond to a "voltage holding circuit," and the motor 80 corresponds to a "detection object". The motor rotation angle θm and the rotation count TC of the motor 80 correspond to "sensor information".

Other Embodiments

In the above embodiment, the stabilized power supply circuit for the sensors is located outside the sensor input processor. In other embodiments, a stabilized power supply circuit for the sensors may be provided within the sensor input processor. The same is true for the booster circuit of the fourth embodiment. In addition, in the sensor input processor, components other than inductors and capacitors, which are difficult to integrate into ICs, can be integrated into a single IC and packaged together in a single package, thereby enabling miniaturization.

In the above embodiment, the voltage monitor circuit or the control unit monitors the charge voltage or the boost voltage, and the power consumption adjustment circuit performs the suppressing process according to the voltage. In other embodiments, the power consumption adjustment circuit may be omitted and the voltage-based suppressing process may not be performed, especially when a booster circuit is provided.

In the above embodiments, the sensor device detects the rotation of the motor. In other embodiments, the sensor device may be something other than a motor rotation angle sensor, such as a torque sensor or a steering sensor. In the above embodiments, one control unit is provided for one sensor input processor. Other embodiments may have multiple controllers for one sensor input processor, or multiple sensor input processors for one controller.

In the above-described embodiments, the motor is a three-phase brushless motor. In other embodiments, the motor is not limited to the three-phase brushless motor, and any motor may be used. Further, the motor may also be a motor generator, or may be a motor-generator having both of a motor function and a generator function, i.e., not necessarily be limited to the rotating electric machine. In the above embodiment, the sensor device is applied to the electric power steering apparatus. In one or more other embodiments, the sensor device may be applied to other apparatuses different from the electric power steering apparatus.

The control circuit and method described in the present disclosure may be implemented by a special purpose computer which is configured with a memory and a processor programmed to execute one or more particular functions embodied in computer programs of the memory. Alternatively, the controller described in the present disclosure and the method thereof may be implemented by a dedicated computer configured as a processor with one or more dedicated hardware logic circuits. Alternatively, the controller and method described in the present disclosure may be implemented using one or more dedicated computers, which include a combination of a processor consisting of one or more hardware logic circuits, and a processor and memory programmed to perform one or more functions. The computer programs may be stored, as instructions to be executed by a computer, in a tangible non-transitory computer-readable medium. The present disclosure is not limited to the embodiment described above but various modifications may be made within the scope of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A sensor device capable of continuing to operate at least partially with electric power supplied from a battery during a period when a starting switch is turned off, the sensor device comprising:

a sensor input processor including a sensor element configured to detect a change in a physical quantity in response to movement of a detection target, an input processing circuit configured to calculate sensor information according to the detected value of the sensor element, and a memory configured to store abnormality information including power failure information pertaining to a power failure in which electric power is not supplied from the battery during the period when the starting switch is turned off; and a voltage holding circuit provided on a battery feed line which supplies battery power to the sensor input processor without going through the starting switch, and capable of applying a voltage to the sensor input processor sufficient to retain at least data in the memory during a temporary voltage drop in the battery, wherein the sensor input processor has an adjustment circuit configured to sequentially stop functions other than data retention in the memory based on a voltage of the voltage holding circuit when the voltage of the voltage holding circuit drops.

2. The sensor device according to claim 1, wherein the voltage holding circuit has a capacitor connected to the battery feed line.

3. The sensor device according to claim 1, wherein the voltage holding circuit has a secondary battery connected to the battery feed line.

4. The sensor device according to claim 1, wherein the voltage holding circuit is a booster circuit provided on the battery feed line.

* * * * *